United States Patent
Nakazawa et al.

(10) Patent No.: US 7,904,216 B2
(45) Date of Patent: Mar. 8, 2011

(54) ELECTRIC TRAIN CONTROL APPARATUS

(75) Inventors: Yosuke Nakazawa, Kunitachi (JP); Tetsu Tone, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/852,725

(22) Filed: Aug. 9, 2010

(65) Prior Publication Data

US 2010/0324761 A1 Dec. 23, 2010

Related U.S. Application Data

(63) Continuation of application No. PCT/JP2008/070704, filed on Nov. 13, 2008.

(51) Int. Cl.
*B60L 9/18* (2006.01)

(52) U.S. Cl. .............................. 701/20; 318/52

(58) Field of Classification Search ........................ None
See application file for complete search history.

(56) References Cited

U.S. PATENT DOCUMENTS

| | | | | |
|---|---|---|---|---|
| 6,499,815 B1 * | 12/2002 | Daigle | ............................ | 303/151 |
| 7,084,602 B2 * | 8/2006 | Donnelly et al. | ............. | 318/807 |
| 7,126,293 B1 * | 10/2006 | Kumar | ............................ | 318/52 |

FOREIGN PATENT DOCUMENTS

| | | |
|---|---|---|
| JP | 6-217410 | 8/1994 |
| JP | 2003-164016 | 6/2003 |
| JP | 2005-6403 | 1/2005 |
| JP | 9-140003 | 5/2007 |
| JP | 2007-318826 | 12/2007 |

* cited by examiner

*Primary Examiner* — Michael J. Zanelli
(74) *Attorney, Agent, or Firm* — Oblon, Spivak, McClelland, Maier & Neustadt, L.L.P.

(57) ABSTRACT

According to one embodiment, an electric train control apparatus having a plurality of electric motors and a plurality of inverters configured to control electric motors, independently of one another, including shaft speed calculating units respectively, and configured to calculate shaft speeds of electric motors, reference speed calculating unit configured to calculate a reference speed from shaft speeds of electric motors, acceleration detection control units configured to calculate torque reduction values from rates at which shaft speeds calculated, slip speed control units configured to reduce torques in accordance with a difference between shaft speeds of electric motors, state monitoring units configured to monitor states of detecting shaft speeds and output state signals, and changeover unit configured to switch control of inverters, between control performed by acceleration detection control units and control performed by slip speed control units, in accordance with state signals received from state monitoring units.

5 Claims, 9 Drawing Sheets

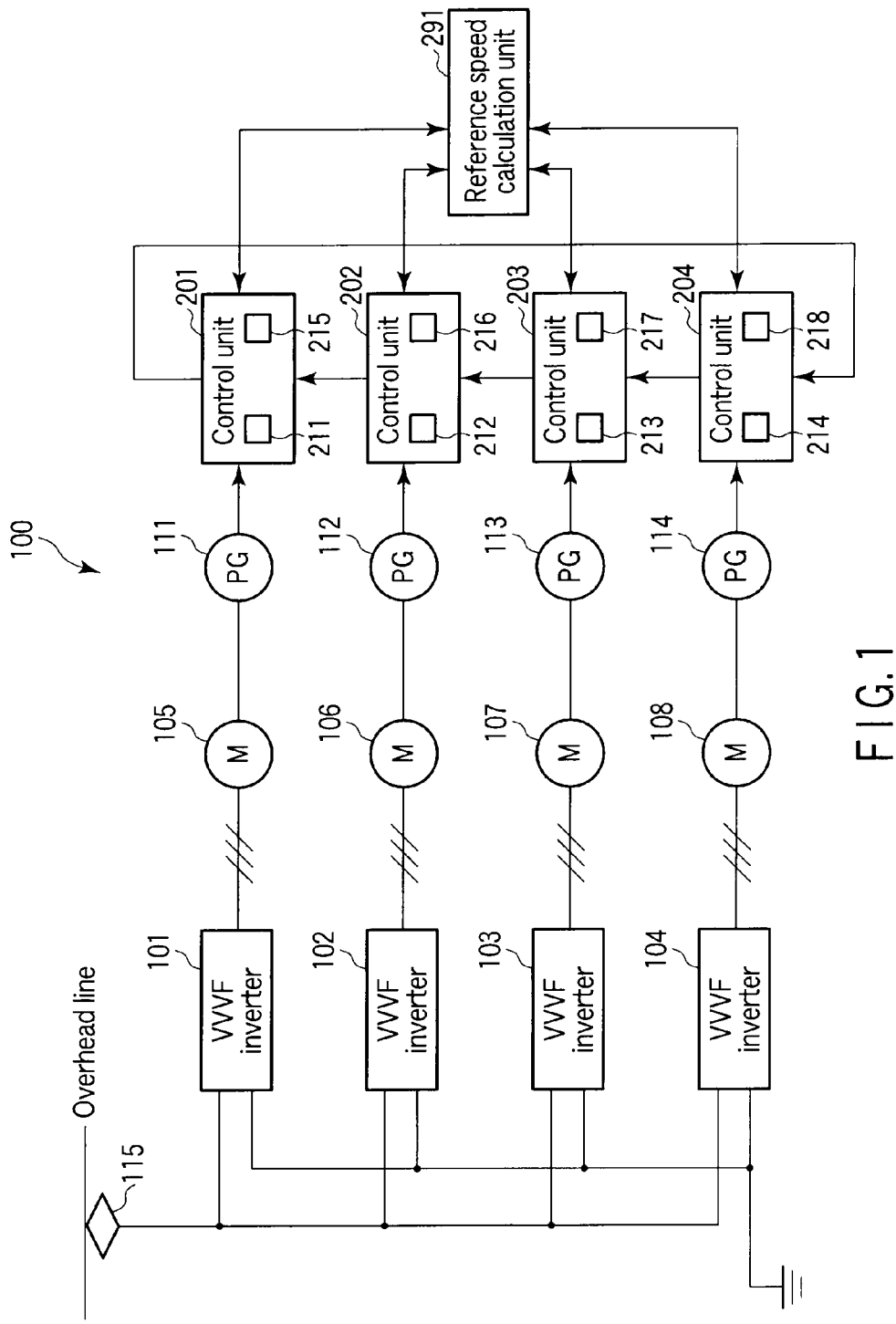
F I G. 1

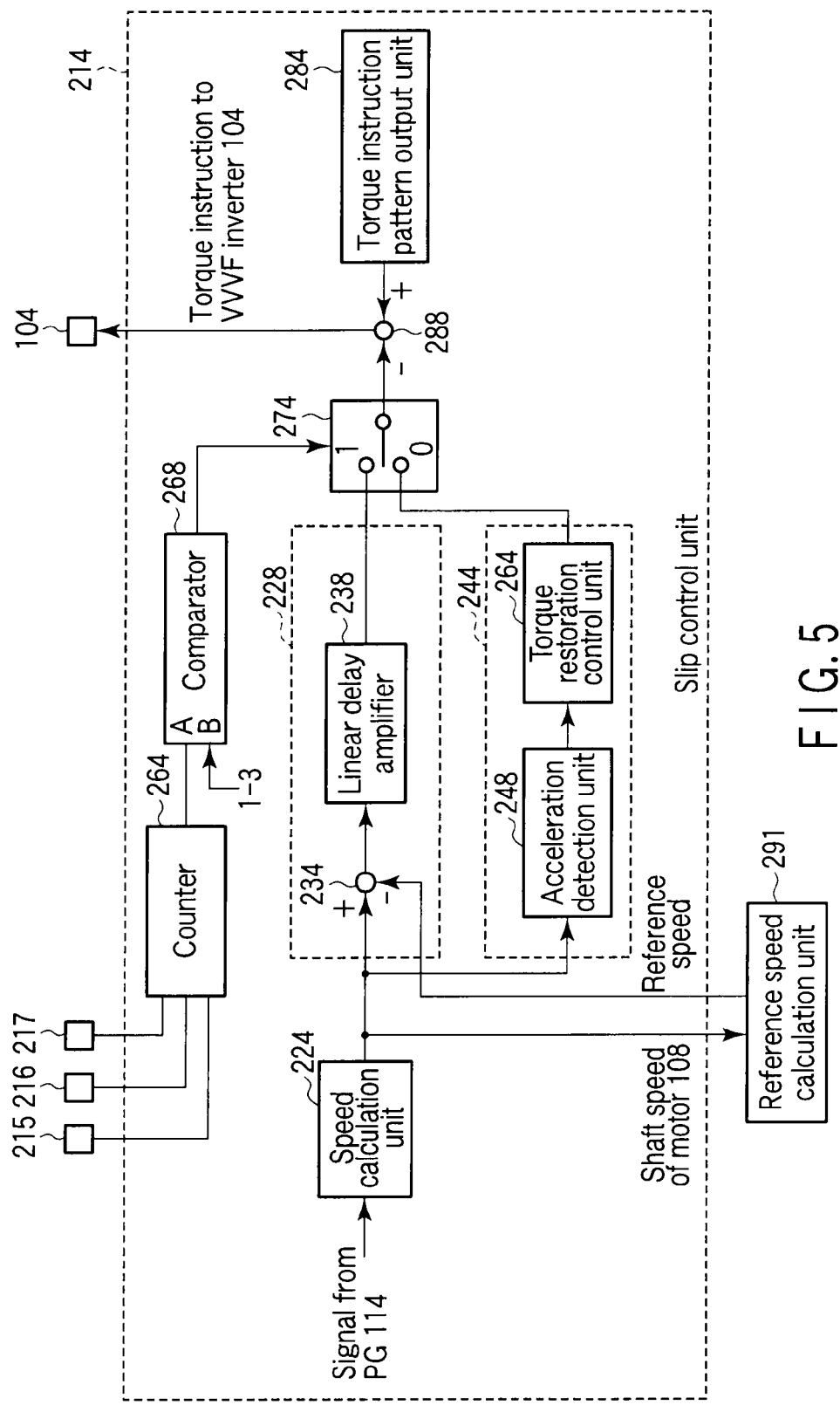
F I G. 5

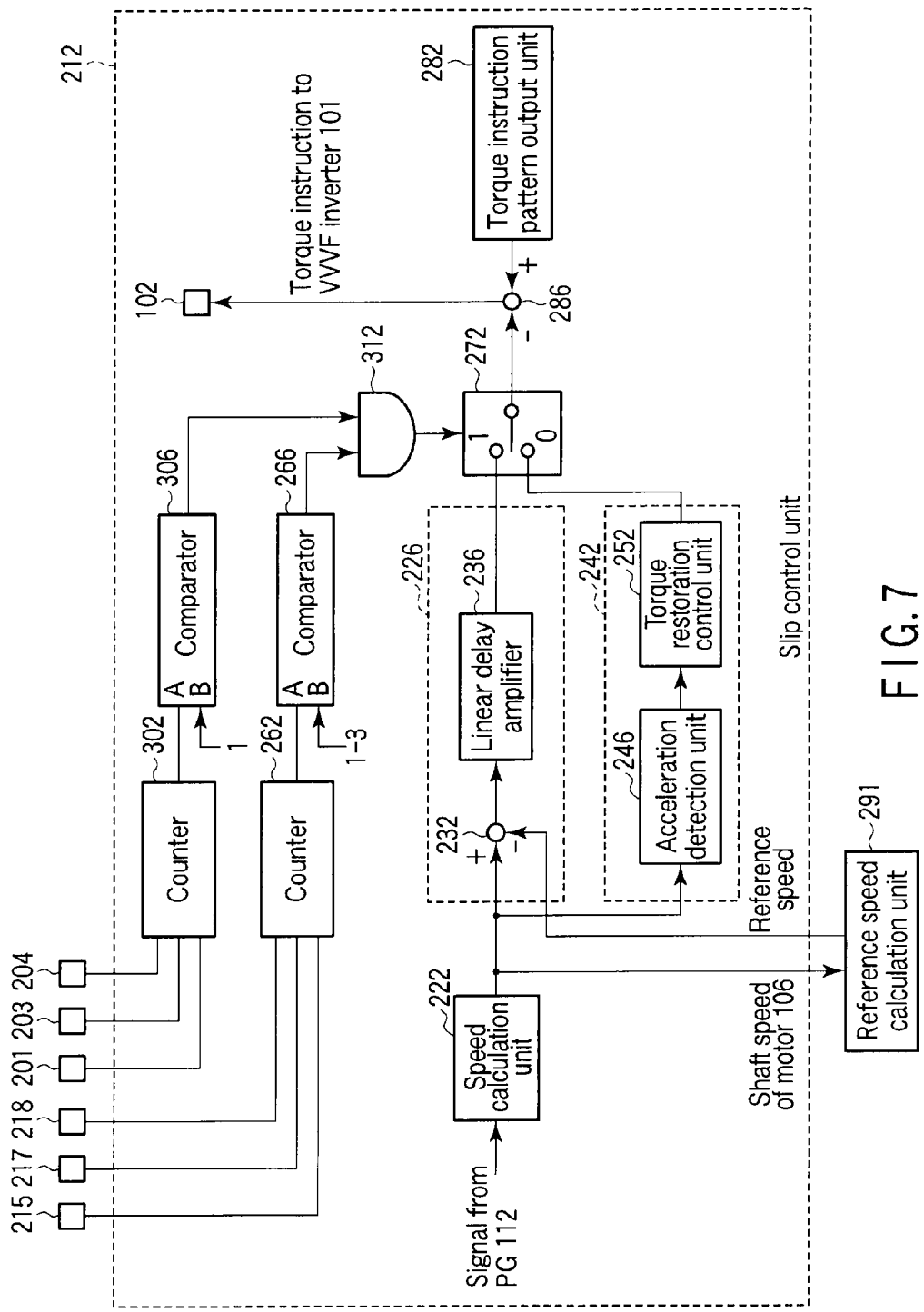
F I G. 7

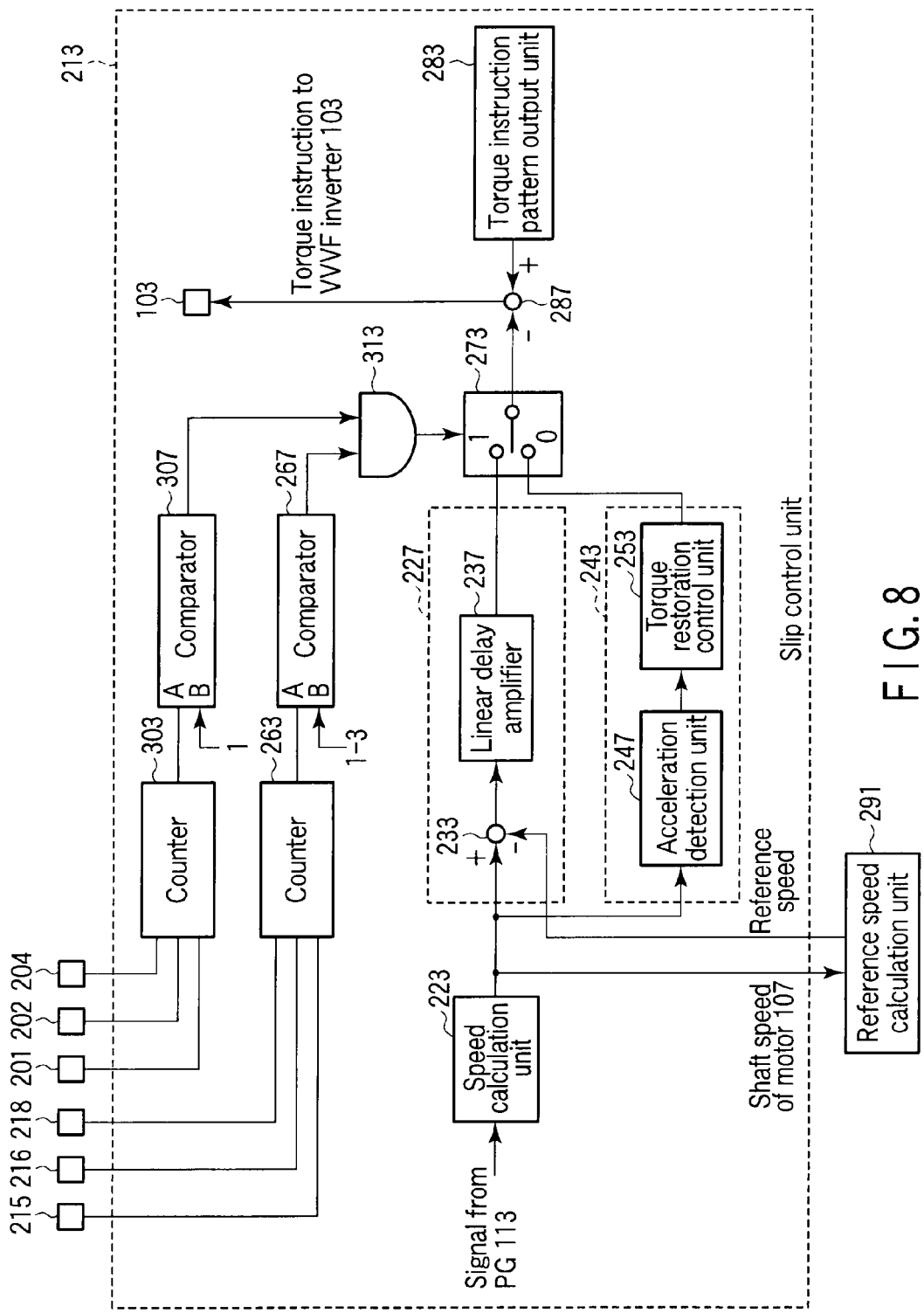
F I G. 8

ELECTRIC TRAIN CONTROL APPARATUS

CROSS REFERENCE TO RELATED APPLICATIONS

This is a Continuation Application of PCT Application No. PCT/JP2008/070704, filed Nov. 13, 2008, which was published under PCT Article 21(2) in Japanese.

FIELD

Embodiments described herein relate generally to an electric train control apparatus that has inverters configured to control a plurality of electric motors, each motor independently of any other.

BACKGROUND

As an apparatus for controlling electric motors that drive an electric train, an electric train control apparatus is available, which has variable-voltage variable-frequency (VVVF) inverters. Also available is an electric train control apparatus that controls a plurality of electric motors of one electric train. In this apparatus, the VVVF inverters control the associated electric motors, respectively.

In the case of an electric train using such a control apparatus as described above, the wheels may slip on a rainy day or a snowy day. While the wheels are slipping, the torque of each electric motor is not conveyed to the rails. Consequently, the travelling ability of the train will decrease.

In this regard, Jpn. Pat. Appln. KOKAI Publication No. 2005-6403, which is a Japanese patent document, discloses an electric train control apparatus that controls the rotation speeds of the electric motor shafts (shaft speeds), achieving a rail adhesion control during the slip, adhering the idling wheels back to the rails during the slip of the wheels.

Available as methods of achieving the rail adhesion control of electric trains are, for example, the acceleration detection control and the slip speed control. When the wheels slip, the shaft speeds of the electric motors abruptly change (increase). In view of this, the shaft speeds of the electric motors are monitored. If the shaft speeds change with time at a rate equal to or higher than a preset value, the acceleration detection control is performed, thereby reducing the torques of the motors.

In the acceleration detection control, the electric train control apparatus determines a reference speed from the shaft speeds of the electric motors. If the shaft speed of any electric motor exceeds the reference speed, the apparatus reduces the torque of the electric motor.

When the electric train control apparatus described above performs the acceleration detection control, it monitors the shaft speed of only one electric motor, thereby achieving the rail adhesion control when the wheels slip. The acceleration detection control had the tendency of reducing the torques of the electric motors too much. Therefore, the average acceleration torque greatly decreases if the wheels slip frequently. As a result, the torque of the electric motor will decrease.

The electric train control apparatus described above monitors a plurality of shaft speeds during the slip speed control, thereby controlling the rail adhesion when the wheels slip. During the slip speed control, the apparatus controls the shaft speeds in accordance with the momentary adhesion force. In this case, the timing of control lags because of the linear delay element. Consequently, the wheels may not be adhered again to the rails. If the wheels on the shafts of all motors, for example, slip, the electric train control apparatus can no longer determine the reference speed. As a result, the rail adhesion cannot be controlled when the wheels slip.

If troubles occur in the lines for transmitting the shaft speeds, in the pulse generators (PGs) for detecting the shaft speeds of the motors or in the inverters, the electric train control apparatus cannot determine the reference speed or may erroneously determine that the wheels slip. In either case, the electric train control apparatus cannot control the rail adhesion.

BRIEF DESCRIPTION OF THE DRAWINGS

FIG. 1 is a block diagram explaining an exemplary configuration of an electric train control apparatus according to one embodiment of this invention;

FIG. 5 is a block diagram explaining a further exemplary configuration of each slip control unit shown in FIG. 1;

FIG. 7 is a block diagram explaining still another exemplary configuration of each slip control unit;

FIG. 8 is a block diagram explaining a another exemplary configuration of each slip control unit.

DETAILED DESCRIPTION

Figure 2:
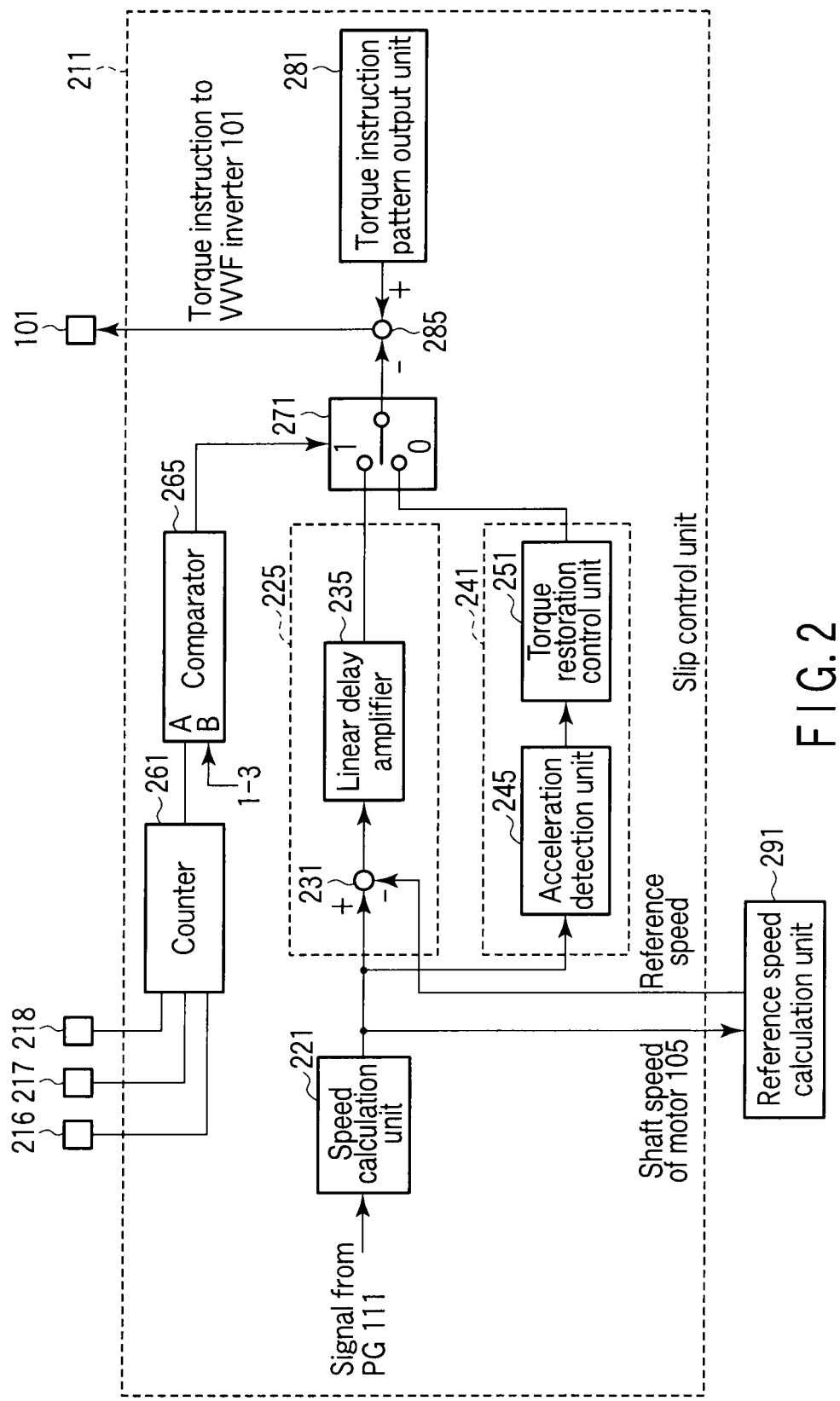
FIG. 2 is a block diagram explaining an exemplary configuration of the slip control units shown in FIG. 1.
Figure 3:
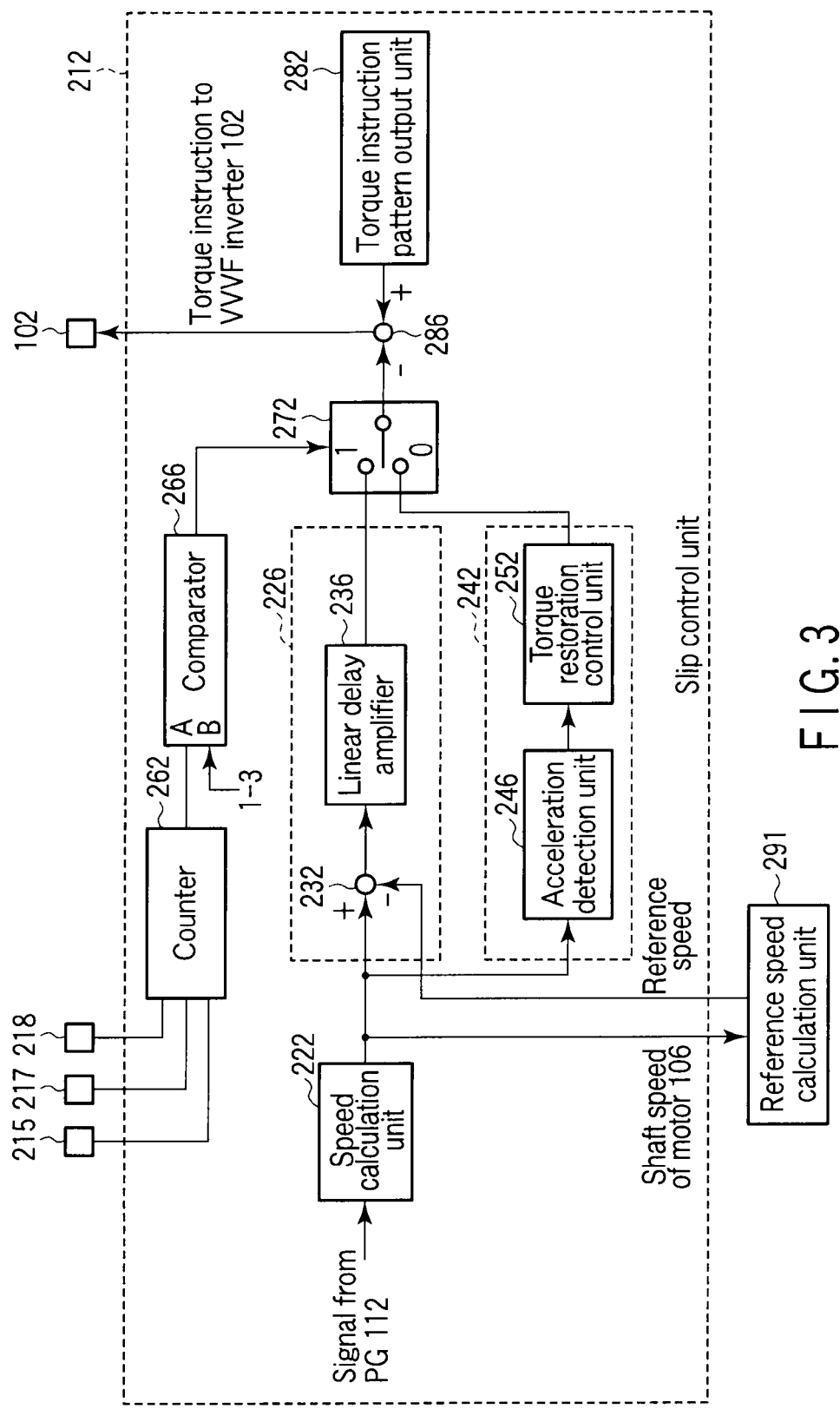
FIG. 3 is a block diagram explaining another exemplary configuration the slip control units shown in FIG. 1 may have.
Figure 4:
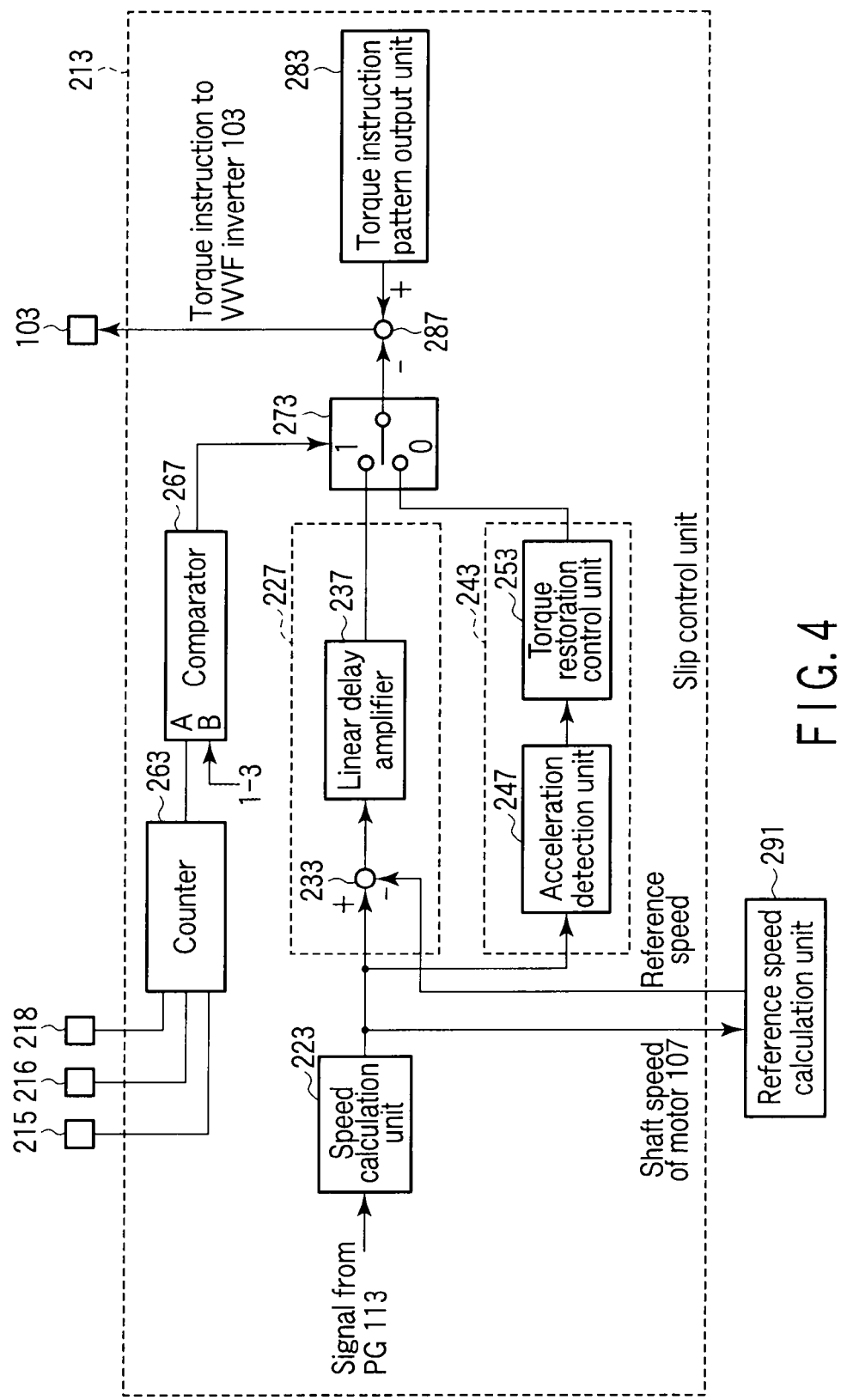
FIG. 4 is a block diagram explaining still another exemplary configuration of each slip control unit shown in FIG. 1.

In general, according to one embodiment, an electric train control apparatus having a plurality of electric motors and a plurality of inverters configured to control the electric motors, independently of one another, characterized by including: shaft speed calculating units provided in association with the electric motors, respectively, and configured to calculate shaft speeds of the electric motors; reference speed calculating unit configured to calculate a reference speed from the shaft speeds of the electric motors, calculated by the shaft speed calculating units; acceleration detection control units provided in association with the inverters, respectively, and configured to calculate torque reduction values from rates at which the shaft speeds calculated by the shaft speed calculating units change with time; slip speed control units provided in association with the inverters, respectively, and configured to reduce torques in accordance with a difference between the shaft speeds of the electric motors, detected by the shaft speed calculating units, and the reference speed output by the reference speed calculating unit; state monitoring units provided in association with the inverters, respectively, and configured to monitor the states of detecting the shaft speeds and output state signals; and changeover unit configured to switch the control of the inverters, between the control performed by the acceleration detection control units and the control performed by the slip speed control units, in accordance with the state signals received from the state monitoring units.

An electric train control apparatus according to one embodiment of this invention will be described in detail, with reference to the accompanying drawings.

FIG. 1 is a block diagram explaining an exemplary configuration of an electric train control apparatus according to one embodiment of this invention.

As shown in FIG. 1, the electric train control apparatus 100 has VVVF inverters 101 to 104, electrostatic induction motors (hereinafter referred to as "electric motors") 105 to 108, pulse generators (PG) 111 to 114, and control units 201 to 204. The electric train control apparatus 100 further has a pantograph 115. Still further, the electric train control apparatus 100 has a reference speed calculation unit 291.

As seen from FIG. 1, the pantograph 115 acquires direct-current power from a direct-current overhead line. The pantograph 115 supplies the direct-current power acquired from the direct-current overhead line, to the VVVF inverters 101 to 104 that are connected in parallel to one another.

Each of the VVVF inverters 101 to 104 converts direct-current power to alternating-current power of a variable frequency. The VVVF inverter 101 is connected to the electric motor 105. The VVVF inverter 102 is connected to the electric motor 106. The VVVF inverter 103 is connected to the electric motor 107. The VVVF inverter 104 is connected to the electric motor 108.

The VVVF inverters 101 to 104 supply alternating-current power to the electric motors 105 to 108, respectively, to which they are respectively connected. That is, the VVVF inverter 101 supplies the alternating-current power to the electric motor 105, the VVVF inverter 102 supplies the alternating-current power to the electric motor 106, the VVVF inverter 103 supplies the alternating-current power to the electric motor 107, and the VVVF inverter 104 supplies the alternating-current power to the electric motor 108.

The electric motors 105 to 108 are driven, each in accordance with the alternating-current power it received, generating mechanical force. That is, when alternating-current power is supplied to each of the electric motors 105 to 108, electric current flows in the coil of the stator of the motor, generating a magnetic field. The magnetic field generated by the coil interacts with the magnetic field of the stator, generating mechanical energy. This energy rotates the shaft of the electric motor.

The pulse generators 111 to 114 detect the shaft speeds of the electric motors. More precisely, the pulse generator 111 detects the shaft speed of the electric motor 105, the pulse generator 112 detects the shaft speed of the electric motor 106, the pulse generator 113 detects the shaft speed of the electric motor 107, and the pulse generator 114 detects the shaft speed of the electric motor 108.

The pulse generators 111 to 114 are connected to the control units 201 to 204, respectively. That is, the pulse generator 111 informs the control unit 201 of the shaft speed of the electric motor 105, the pulse generator 112 informs the control unit 202 of the shaft speed of the electric motor 106, the pulse generator 113 informs the control unit 203 of the shaft speed of the electric motor 107, and the pulse generator 114 informs the control unit 204 of the shaft speed of the electric motor 108.

The control units 201 to 204 have slip control units 211 to 214 and state monitoring units 215 to 218, respectively. As shown in FIG. 1, the control units 201 to 204 are arranged in association with the shafts of the electric motors 105 to 108, respectively.

The slip control units 211 to 214 calculate the shaft speeds, detect slip of wheels and control the shaft speeds of the electric motors, thereby performing rail adhesion control when the wheels slip. The slip control units 211 to 214 output the shaft speeds of the respective motors 105 to 108 to the reference speed calculation unit 291.

Moreover, the slip control units 211 to 214 perform rail adhesion control, calculating appropriate torque instructions, and then transmit the torque instructions, thus calculated, to the VVVF inverters 101 to 104. That is, the slip control units 211 to 214 control the rail adhesion, thereby controlling the voltage and frequency of the alternating-current power output from each of the VVVF inverters 101 to 104. The slip control units 211 to 214 thus control the shaft speeds of the electric motors 105 to 108.

The state monitoring units 215 to 218 work as state monitoring means. The state monitoring units 215 to 218 detect troubles, if any, in the lines for transmitting the shaft speed, in the pulse generators 111 to 114 for detecting the shaft speeds of the motors, or in the VVVF inverters 101 to 104 due to opening. That is, the state monitoring units 215 to 218 monitor the states of detecting the shaft speeds.

The state monitoring units 215 to 218 supply state signals to the control units 201 to 204, each state signal showing whether a trouble has occurred. That is, the state monitoring units 215 to 218 supply abnormal-state signals to the control units 201 to 204 if they detect any troubles, and supply normal-state signals to the control units 201 to 204 if they do not detect any troubles.

The state monitoring units 215 to 218 supply abnormal-state signals if the pulse generators 111 to 114, for example, have troubles, rendering it impossible to calculate the shaft speeds correctly.

Further, the state monitoring units 215 to 218 supply abnormal-state signals if the lines for transmitting the shaft speed, for example, have troubles, rendering it impossible to calculate the shaft speeds correctly.

Still further, the state monitoring units 215 to 218 supply abnormal-state signals to the control units 201 to 204 if the VVVF inverters 101 to 104 have troubles (due to opening, for example).

The reference speed calculation unit 291 calculates a reference speed from the shaft speeds received from the control units 201 to 204. The reference speed calculation unit 291 selects, for example, the lowest of the shaft speeds received from the control units 201 to 204, and uses it as the reference speed. The reference speed calculation unit 291 distributes the reference speed to the control units 201 to 204.

The slip control units 211 to 214 perform either the acceleration detection control or the slip speed control, thereby to achieve a rail adhesion control when the wheels slip. The slip control units 211 to 214 determine which control should be performed, the acceleration detection control or the slip speed control, in accordance with the number of abnormal-state signals supplied from the state monitoring units 215 to 218.

FIG. 2 to FIG. 5 are block diagrams explaining various exemplary configurations that the slip control units 211 to 214 shown in FIG. 1 may have.

The slip control units 211 to 214 shown in FIG. 1 are identical in configuration. Therefore, only the slip control unit 211 shown in FIG. 2 will be described.

The slip control unit 211 has a speed calculation unit 221, a slip speed calculation unit 225, an acceleration detection control unit 241 a counter 261, a comparator 265, a changeover switch 271, and a torque instruction pattern output unit 281.

The speed calculation unit 221 calculates the shaft speed of the electric motor 105 from the revolutions per unit time of the electric motor 105, which has been received from the pulse generator 111. The speed calculation unit 221 outputs a signal representing the shaft speed, thus calculated, to the reference speed calculation unit 291, the slip speed calculation unit 225 and the acceleration detection control unit 241.

The slip speed calculation unit 225 has a subtracter 231 and a linear delay amplifier 235. The subtracter 231 subtracts the reference speed calculated by the reference speed calculation unit 291 from the shaft speed calculated by the speed calculation unit 221. The subtracter 231 outputs the speed difference having a value greater than zero, to the linear delay amplifier 235.

The linear delay amplifier 235 performs a filtration process to suppress an abrupt change in the signal output from the subtracter 231. The linear delay amplifier 235 inputs the signal subjected to the filtration process, to the input terminal of the changeover switch 271.

That is, the slip speed calculation unit 225 outputs the difference between the shaft speed of the electric motor 105 and the reference speed. In order to perform the slip speed control, thereby to control the rail adhesion control when the wheels slip, the control unit 201 performs a control, reducing the torque in accordance with the difference between the shaft speed of the electric motor 105 and the reference speed. In this case, the control unit 201 and the slip control unit 211 function as a slip speed control means.

The acceleration detection control unit 241 has an acceleration detection unit 245 and a torque restoration control unit 251. The acceleration detection unit 245 keeps calculating the rate at which the shaft speed calculated by the speed calculation unit 221 changes with time.

The torque restoration control unit 251 determines whether the wheels slip, from the change rate calculated by the acceleration detection unit 245. That is, the torque restoration control unit 251 functions as a slip detection means. Upon detecting the slip of the wheels, the torque restoration control unit 251 determines the shaft speed that prevents the wheels from slipping, and calculates the value by which to reduce the torque of the electric motor 105. The torque restoration control unit 251 inputs the signal representing this value, to the input terminal of the changeover switch 271.

To perform the acceleration detection control in order to control the rail adhesion when the wheels slip, the control unit 201 reduces the torque in accordance with the value by which to reduce the torque, the value having been calculated by the torque restoration control unit 251. In this case, the control unit 201 and the slip control unit 211 function as an acceleration detecting means.

The counter 261 counts the normal-state signals input to its input terminal and outputs the number of normal-state signals counted, from its output terminal. That is, the counter 261 counts the normal-state signals received from the state monitoring units of the other control units (from the state monitoring units 216, 217 and 218, in this embodiment). The counter 261 outputs the number of normal-state signals to the comparator 265.

The comparator 265 compares the signals input to its two input terminals (i.e., terminal A and terminal B). Based on the result of comparison, the comparator 265 generates a signal of high level "1" or low level "2," which is input to the changeover switch 271.

The input terminal A of the comparator 265 receives the signal output from the counter 261. That is, a signal at the level corresponding to the number of normal-state signals counted by the counter 261 is input to the input terminal A of the comparator 265.

The input terminal B of the comparator 265 receives a signal of the level corresponding to a given number. The given number can be set to any value equal to or greater than one, but not exceeding the number of electric motors the electric train control apparatus 100 has.

The given number determining the level of the signal input to the input terminal B determines the condition of selecting the slip speed control as the rail adhesion control performed when the wheels slip. That is, the slip speed control is selected, as rail adhesion control, if the number of normal-state signals input to the input terminal A is larger than the given number that defines the number of signals to be input to the input to the input terminal B.

The comparator 265 output "1" from its output terminal if more signals are input to the input terminal A than to the input terminal B. That is, the comparator 265 outputs "1" from its output terminal if the number of normal-state signals counted by the counter 261 is equal to or greater than the given number.

The changeover switch 271 supplies either the signal input from the slip speed calculation unit 225 or the signal output from the acceleration detection control unit 241, in accordance with the output of the comparator 265. That is, the changeover switch 271 outputs the signal input from the slip speed calculation unit 225 to a subtracter 285 if it receives "1" from the comparator 265. If the changeover switch 271 receives "0" from the comparator 265, it outputs the signal input from the acceleration detection control unit 241, to the subtracter 285.

The torque instruction pattern output unit 281 outputs a torque instruction pattern to the subtracter 285, in response to a manipulation using a notch or the like.

The subtracter 285 subtracts the signal output from the changeover switch 271 from the signal of torque instruction pattern, which has been output from the torque instruction pattern output unit 281. The subtracter 285 outputs the difference acquired by this subtraction.

The slip control unit 211 outputs the signal output from the subtracter 285, as torque instruction signal, to the VVVF inverter 101. The VVVF inverter 101 keeps calculating a voltage instruction from the torque instruction signal. On the basis of the voltage instruction, the VVVF inverter 101 generates a gate instruction that controls the gates provided in the VVVF inverter 101. The VVVF inverter 101 is thereby controlled.

As described above, each control unit of the electric train control apparatus according to this embodiment receives the signals representing the states of the shafts associated with the other control units. Based on these signals, the control unit counts the shafts whose speeds can be accurately detected. If the count is equal to or greater than a prescribed value, the control unit will perform the slip speed control. If the count is smaller than the prescribed value, the control unit will perform the acceleration detection control. Thus, the slip speed control and the acceleration detection control can be switched, from one to the other, in accordance with the speed of each shaft.

The present embodiment can therefore provide an electric train control apparatus that can perform an accurate rail adhesion control when the wheels slip.

Other embodiments of this invention will be described below.

FIG. 6 to FIG. 9 are block diagrams explaining other configurations the each slip control unit may have.

The slip control unit 211 to 214 shown in FIG. 6 to FIG. 9 identical in terms of configuration.

Figure 6:
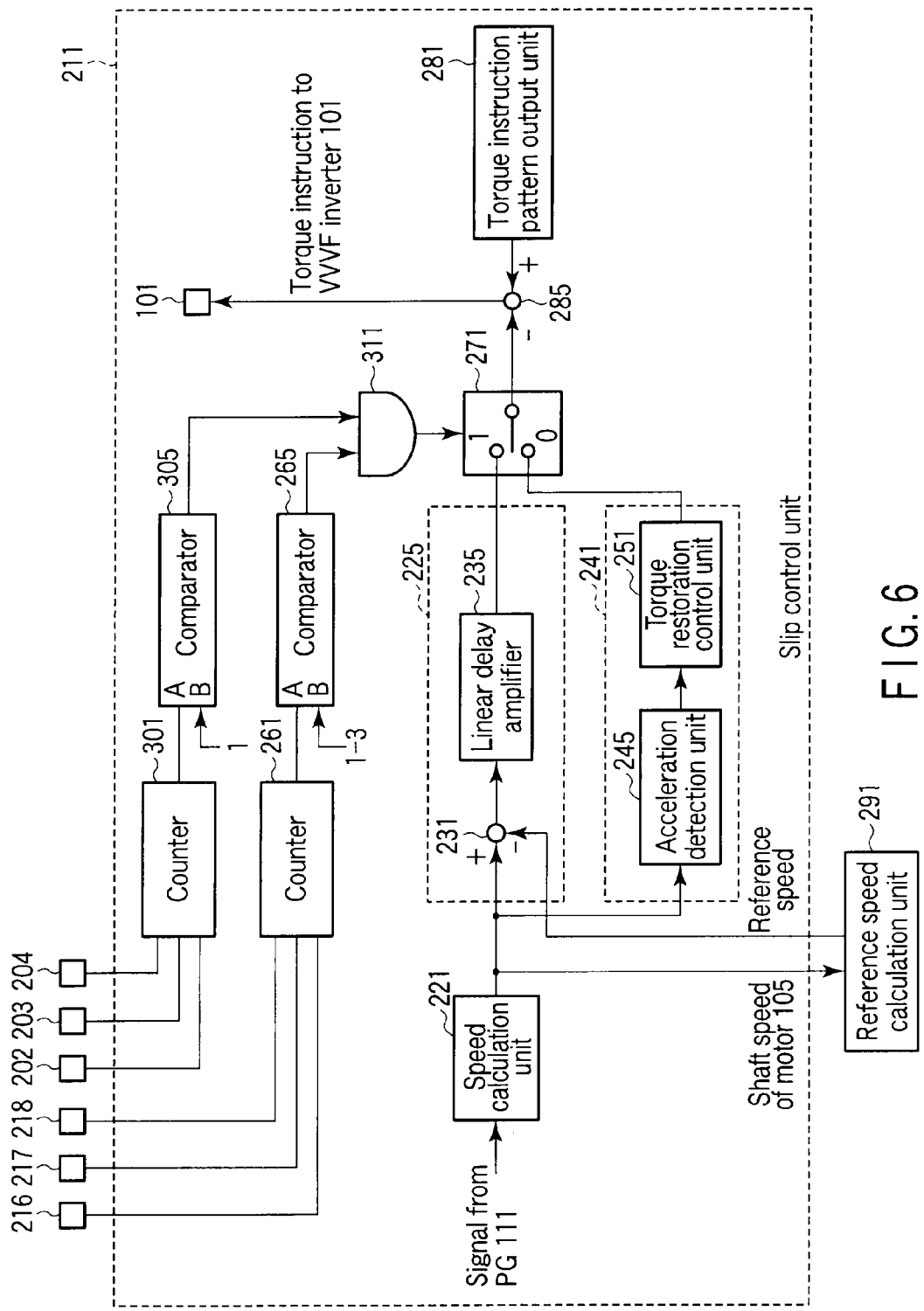
FIG. 6 is a block diagram explaining another exemplary configuration of each slip control unit.
Figure 9:
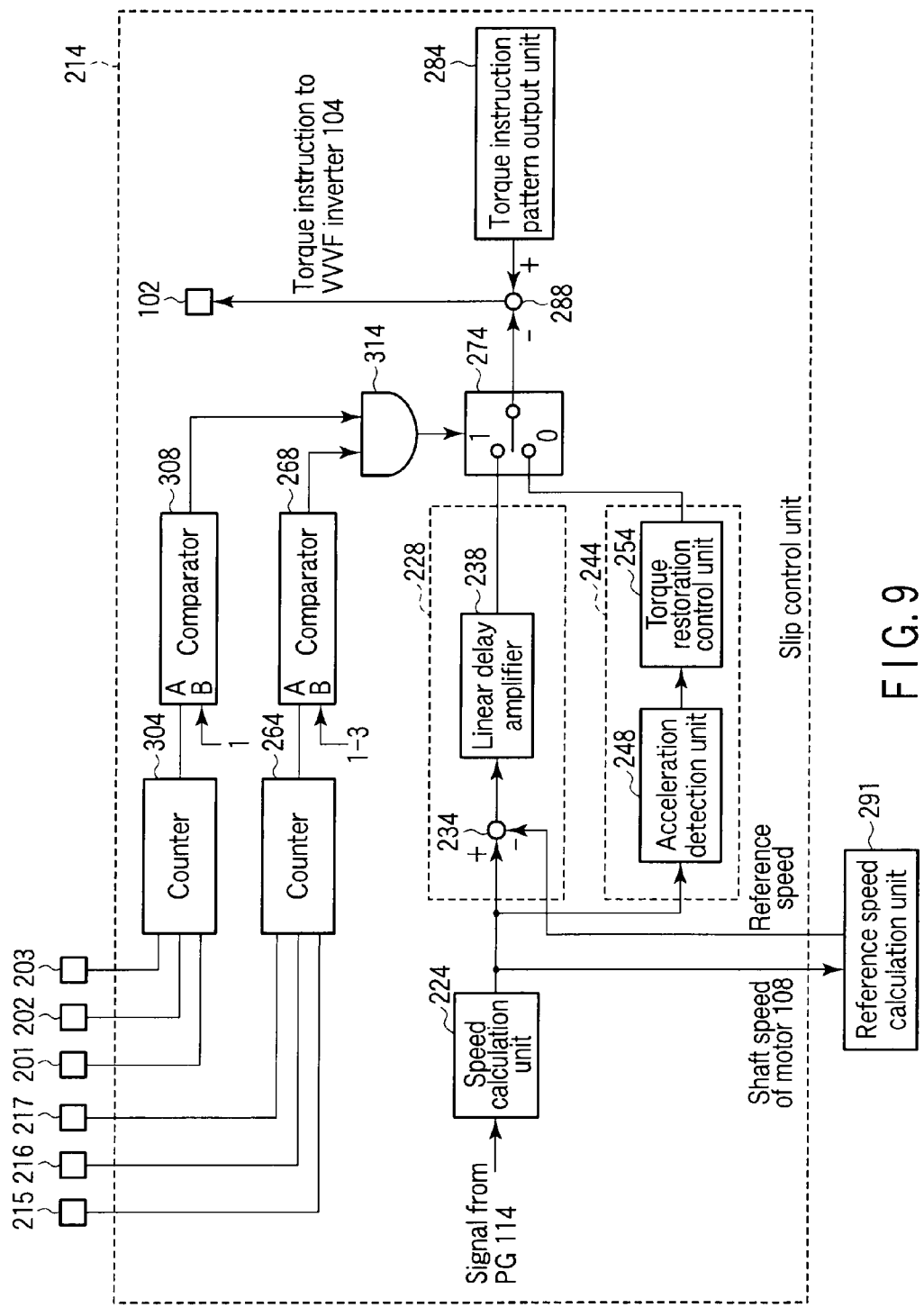
FIG. 9 is a block diagram explaining a further exemplary configuration of each slip control unit.

Therefore, only the slip control unit 211 shown in FIG. 6 will be described.

The slip control unit 211 have a speed calculation unit 221, a slip speed calculation unit 225, an acceleration detection control unit 241, a counter 261, a comparator 265, a changeover switch 271, a torque instruction pattern output unit 281, a counter 301, a comparator 305, and a logic product circuit 311. The counter 301 counts the normal-state signals input to its input terminal and outputs the number of the normal-state signals counted, from its output terminal. The input terminal of the counter 301 is connected to the other control units 212, 213 and 214.

The other control units 212, 213 and 214 input a normal-state signal to the counter 301 upon detecting the slip of the wheels. If the other control units 212, 213 and 214 do not detect slip, they input a normal-state signal to the counter 301. The counter 301 counts the normal-state signals it has received and outputs the number of the normal-state signals counted, to the comparator 305.

The comparator 305 compares the signals input to the two input terminals (i.e., terminal A and terminal B). Based on the result of comparison, the comparator 265 generates a signal of high level "1" or low level "0", which is input to the logic product circuit 311.

The input terminal A of the comparator 265 receives the signal output from the counter 301. That is, a signal of the level corresponding to the number of normal-state signals counted by the counter 301 is input to the input terminal A of the comparator 305.

A signal of the level corresponding to "1" is input to the input terminal B of the comparator 305. The comparator 305 outputs "1" if the signal input to the input terminal A has a level higher than the signal input to the input terminal B. That is, the comparator 305 outputs "1" from its output terminal to the logic product circuit 311 if the number of normal-state signals the counter 301 has counted is equal to or greater than "1".

The logic product circuit 311 has at least two input terminals. The logic product circuit 311 outputs a signal "1" if "1" is input to all input terminals.

One input terminal of the logic product circuit 311 is connected to the comparator 265. The other input terminal of the logic product circuit 311 is connected to the comparator 305. That is, the logic product circuit 311 outputs a signal "1" to the changeover switch 271 if the number of normal-state signals supplied from the state monitoring units 216, 217 and 218 is equal to or greater than the number set to the comparator 265 and if the number of normal-state signals received from the control units 212, 213 and 214 is equal to or greater than "1".

As indicated above, each control unit of the electric train control apparatus according to this embodiment receives, from the other control units, signals representing the state of the shafts associated with them. The control unit then counts the shafts whose speeds can be accurately detected, on the basis of the signals it has received. Further, each control unit of the electric train control apparatus receives signals about slip from the other control units. The control unit then counts the shafts not undergoing slip, on the basis of the signals it has received.

Each control unit performs the slip speed control if the number of shafts whose speeds can be accurately detected is equal to or greater than the preset number and if one or more shafts do not undergo slip. Each control unit performs the acceleration detection control if the number of shafts whose speeds can be accurately detected is less than the preset number or no shafts undergo slip.

Thus, the control can be switched, from the slip speed control to the acceleration detection control, or vice versa, in accordance with the shaft speeds and the results of slip detection. The invention can therefore provide an electric train control apparatus that can perform an accurate rail adhesion control when the wheels slip.

The present invention is not limited to the embodiments described above. The components of any embodiment can be modified in various manners in reducing the invention to practice, without departing from the sprit or scope of the invention. Further, the components of any embodiment described above may be combined, if necessary, in various ways to make different inventions. For example, some of the component of any embodiment may not be used. Moreover, the components of the different embodiments may be combined in any desired fashion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric train control apparatus having a plurality of electric motors and a plurality of inverters configured to control the electric motors, independently of one another, comprising:
    shaft speed calculating units provided in association with the electric motors, respectively, and configured to calculate shaft speeds of the electric motors;
    reference speed calculating unit configured to calculate a reference speed from the shaft speeds of the electric motors, calculated by the shaft speed calculating units;
    acceleration detection control units provided in association with the inverters, respectively, and configured to calculate torque reduction values from rates at which the shaft speeds calculated by the shaft speed calculating units change with time;
    slip speed control units provided in association with the inverters, respectively, and configured to reduce torques in accordance with a difference between the shaft speeds of the electric motors, calculated by the shaft speed calculating units, and the reference speed output by the reference speed calculating unit;
    state monitoring units provided in association with the inverters, respectively, and configured to monitor states of detecting the shaft speeds and output state signals; and
    changeover unit configured to switch control of the inverters, between the acceleration detection control units and the slip speed control units, in accordance with the state signals received from the state monitoring units.

2. The electric train control apparatus according to claim 1, wherein the state monitoring units output an abnormal-state signal upon determining that the shaft speed calculating units do not accurately calculate the shaft speeds, and the changeover unit selects the acceleration detection control units upon determining that the number of abnormal-state signals received from the state monitoring units is equal to or greater than a preset number.

3. The electric train control apparatus according to claim 1, wherein the state monitoring units output an abnormal-state signal upon determining that the shaft speed calculated by the shaft speed calculating units has not been correctly transmitted to the reference speed calculating unit, and the changeover unit selects the acceleration detection control units upon determining that the number of abnormal-state signals received from the state monitoring units is equal to or greater than a preset number.

4. The electric train control apparatus according to claim 1, wherein the state monitoring units output an abnormal-state signal, as a state signal, upon detecting that any of the inverters is in an abnormal state, and the changeover unit selects the acceleration detection control units upon determining that the number of abnormal-state signals received from the state monitoring units is equal to or greater than a preset number.

5. The electric train control apparatus according to claim 1, wherein slip detecting units are further provided and configured to detect slip in accordance with the rates at which the shaft speeds of the electric motors, which have been calculated by the shaft speed calculating units, change with time, and the changeover unit selects the acceleration detection control units when a number of abnormal-state signals the state monitoring units have output upon detecting abnormal states is equal to or greater than a preset number or when slip is detected at all other shafts.

* * * * *